Dec. 6, 1938.  A. LYSHOLM ET AL  2,139,090
BRAKING
Filed Jan. 28, 1936  2 Sheets-Sheet 1
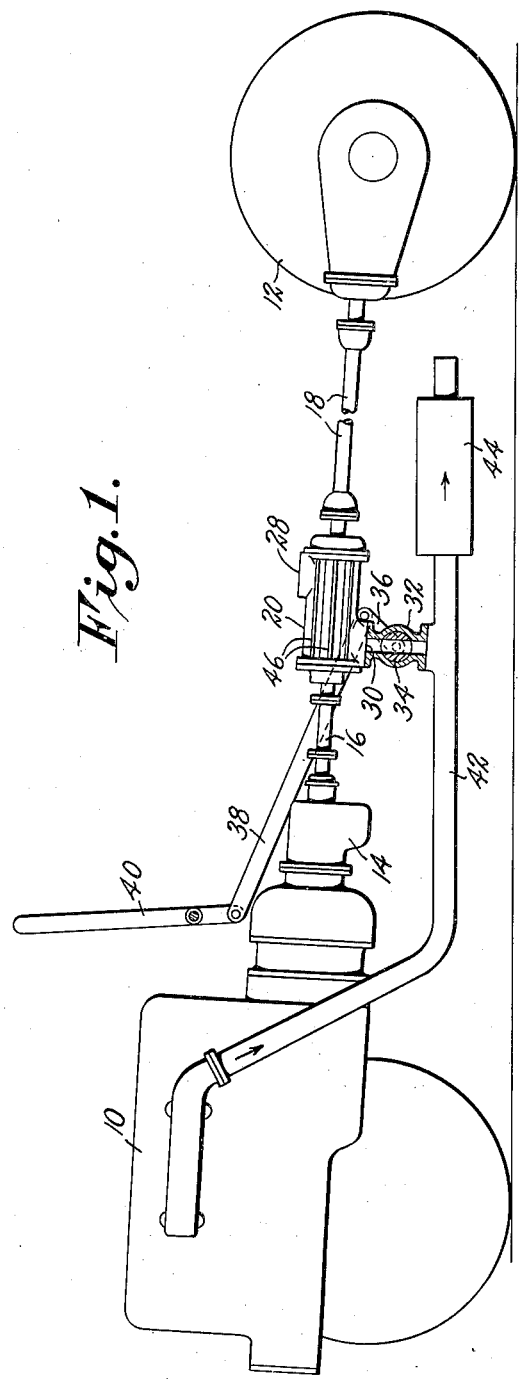
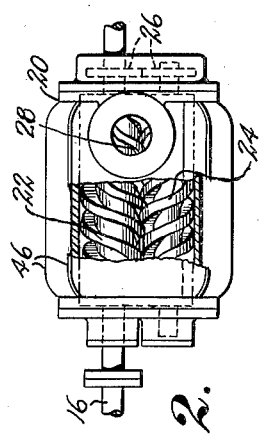
INVENTORS
Alf Lysholm
Gösta Wahlstein
BY
their ATTORNEY.

Dec. 6, 1938. A. LYSHOLM ET AL 2,139,090
BRAKING
Filed Jan. 28, 1936   2 Sheets-Sheet 2

INVENTORS
Alf Lysholm
Göta Wahlstin
BY James C. Markle
their ATTORNEY.

Patented Dec. 6, 1938

2,139,090

UNITED STATES PATENT OFFICE 2,139,090

BRAKING

Alf Lysholm and Gösta Wahlsten, Stockholm, Sweden, assignors to Aktiebolaget Ljungströms Ångturbin, Stockholm, Sweden, a corporation of Sweden Application January 28, 1936, Serial No. 61,136
In Sweden February 1, 1935

14 Claims. (Cl. 123—97)

The present invention relates to braking and has particular reference to braking means for engines, especially for engines employed for driving motor vehicles.

The general object of the invention is the provision of novel braking means which will provide smooth and elastic braking for the engine and/or a vehicle or other element driven by the engine.

In order to achieve the above general object and other and more detailed objects which will appear as this description proceeds, the invention contemplates the improvement of a compressor operatively connected to the engine, or to parts driven by the engine, and arranged so that the work done by the compressor may be arbitrarily increased so as to produce a braking effect reacting on the engine or parts driven thereby.

Preferably, in accordance with the invention, the regulation of the amount of work done by the compressor in order to produce the desired braking effect is accomplished by causing the back pressure against which the compressor operates to be varied. Advantageously, this is effected by a regulation of the outlet of the compressor, for example, by throttling.

The compressor, which is to be used for braking purposes, can within the scope of the invention be used solely for braking. However, it is also contemplated within the scope of the invention that the compressor be used to provide compressed fluid for serving a useful purpose when the compressor is not utilized for braking, suitable control being provided so as to enable the compressor to supply compressed air or other fluid to a place of utilization when desired and, when desired, to operate against an increased back pressure to provide the desired braking effect.

It will be evident that the invention may be embodied in many different specific applications and arrangements, and, for a better understanding of the invention, reference may best be had to the ensuing portion of this specification in which several embodiments of apparatus for carrying the invention into effect are described by way of example but without limitation as to the application of the invention to other specific uses.

In the drawings forming a part of this specification:

Fig. 1 is a more or less diagrammatic side elevation of the engine and drive line of a vehicle chassis to which the invention is applied;

Fig. 2 is a plan view of part of the apparatus shown in Fig. 1, a portion of the apparatus being broken away;

Figure 3:
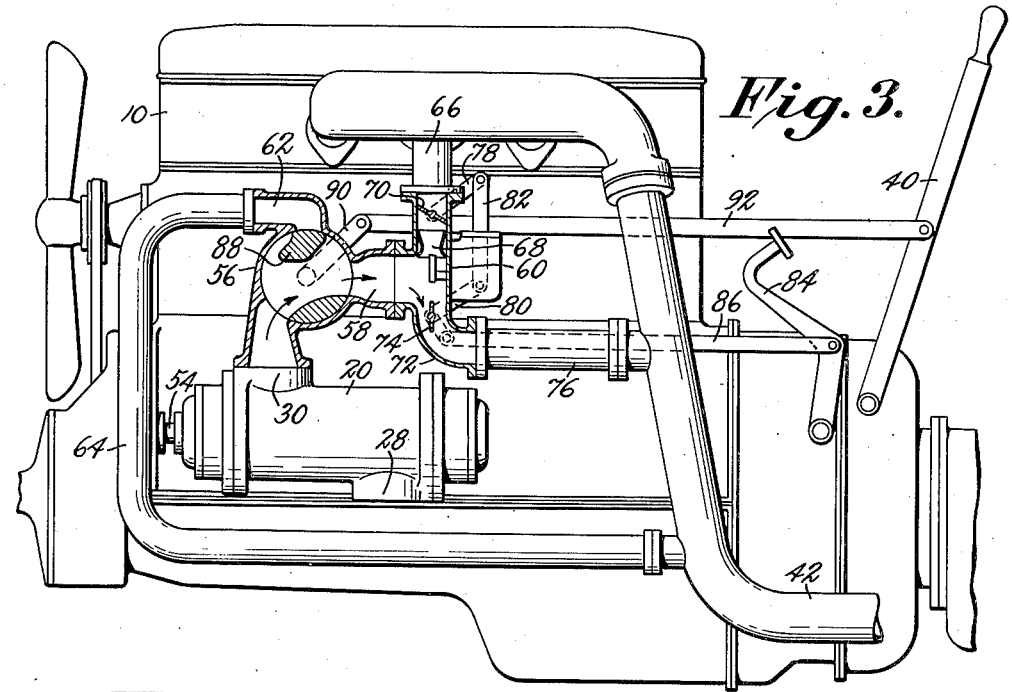
Fig. 3 is a side elevation partly in section of a supercharged engine embodying the invention.

Referring now more particularly to Figs. 1 and 2 of the drawings, the arrangement illustrated shows the invention applied to an automobile or other automotive chassis in which power from an engine 10 is delivered to driving wheels 12 through a suitable transmission indicated diagrammatically at 14 and a drive line consisting of the intermediate drive shaft 16 and final drive shaft 18.

The compressor indicated at 20 is in this embodiment inserted directly in the drive line so as to be driven by the engine and so as to also be driven whenever the vehicle is in motion regardless of whether or not the engine is disconnected from the drive line through the usual clutch.

While the specific form of the compressor may vary within the scope of the invention, a preferred form is of the axial flow screw type comprising intermeshing screw rotors 22 and 24, one of which is driven directly from the drive line and has geared thereto by means of suitable gears 26 the second rotor. The number of rotors employed may vary, that is, more than two rotors may be used and preferably the rotors are arranged with clearance between them and the casing of the compressor and also with clearance between the intermeshing teeth of the rotors. A suitable kind of compressor of this general type is described in detail in U. S. patent application, Serial No. 44,935 filed October 14, 1935, by Alf Lysholm.

In the embodiment illustrated, the inlet for the compressor is at 28 and the outlet is at 30. A valve 32 controls the outlet from the compressor and is provided with a movable valve member 34 to which a lever 36 is attached. Lever 36 is in turn connected by means of link 38 to a control lever or rod 40 by means of which the valve can be adjusted to provide any desired degree of throttling of the outlet of the compressor. The fluid discharged through valve 32 may be discharged directly to atmosphere but in some instances it may be advantageous to connect it as shown to the exhaust line 42 of the engine so that the air discharged from the compressor passes through the muffler 44. As will hereinafter more fully appear, the discharge from the compressor may be conducted to some place of utilization instead of being discharged to atmosphere or to the engine exhaust line.

The operation of the apparatus just described will be largely obvious. When the control valve 32 is in open position, as shown in the figure, the air discharged from the compressor has substantially free egress and the work done by the compressor will be substantially negligible. Upon movement of the control lever 40 to the right from the position shown in the figure, the valve 32 will be closed more or less depending upon the extent of movement of the control and will throttle the outlet from the compressor, thereby raising the back pressure against which the compressor has to work and increasing the amount of work done by the compressor. Obviously, the increased amount of work done by the compressor will produce a braking effect reacting on the drive line and consequently on the vehicle wheels and also on the engine if the latter remains connected to the drive line.

The increased work done by the compressor appears of course in the form of heat, some of which heat is imparted to the compressed air in the form of increased temperature and some of which is absorbed from the heated air by the compressor and dissipated by radiation therefrom. In order to assist in radiating heat from the compressor and preventing excessive temperatures being reached when it is being used as a brake, the casing may be advantageously provided with heat radiating fins 46.

Obviously, the compressor need not be connected directly into the drive line, as indicated in Fig. 2 but may be suitably geared thereto by either constant speed or variable speed gearing.

As previously noted, the output of the compressor may be employed for any desired useful purpose and, among the several purposes for which air compressed by the compressor may be advantageously used, a particularly desirable use is that of providing supercharging for the engine driving the compressor.

In Fig. 3, an arrangement is illustrated in which the compressor is employed to provide supercharging for a carburetor engine and in the arrangement shown the supercharger is placed ahead of the carburetor although other arrangements of the relation of the supercharger to the carburetor and to the air inlet of the engine may be employed within the scope of the invention.

In the arrangement illustrated, the compressor 20 is driven by shaft 54 suitably geared to the crank shaft of the engine 10. The compressor is advantageously of the same type previously described and has an air inlet at 28 and an outlet at 30. A control valve 56 is placed in the discharge line which has a first branch 58 connected to the intake pipe 60 of the engine and a second branch 62 which in the embodiment shown is connected by means of pipe 64 to the exhaust line 42 of the engine.

The intake pipe 60 connects to the intake manifold 66 and includes a carburetor diagrammatically indicated at 68. On the outlet side of the carburetor, a throttle valve 70 of the usual butterfly type is provided to control the admission of fuel to the engine. The branch 58 from the supercharger control valve is connected into the engine intake pipe on the intake side of the carburetor and a branch pipe 72 controlled by the valve 74, which is advantageously of the butterfly type, provides a by-pass which in the present instance is connected by means of pipe 76 to the exhaust pipe 42.

Valves 70 and 74 are interconnected by means of levers 78 and 80 and link 82 so that when one of these valves is open, the other is closed and vice versa. The position of these valves is controlled by means of the usual accelerator pedal 84, connected through the links 86.

The control valve 56 is of the rotary plug type having a movable valve member 88 connected to lever 90 which is in turn connected by means of the link 92 to the control lever 40. The valve member is provided with a passage 93 formed so as to connect the valve inlet port 96 with either the outlet port 98 with which the branch 58 is in communication or the outlet port 100 with which the branch 62 is in communication. When the valve is in one terminal position, as shown in Fig. 3, the valve inlet port is fully open and unrestricted flow from the supercharger through the valve to the branch 58 is permitted. In the other terminal position of the valve, as shown in Fig. 4, the outlet port 98 is entirely closed, preventing flow of air from the supercharger to the engine, and the outlet port 100 is fully open for delivery of the compressed air from the supercharger to the pipe leading to the exhaust line.

In intermediate positions of the valve, it will be evident that part of the air compressed by the supercharger may flow to the branch 58 and part to the branch 62.

Figure 4:
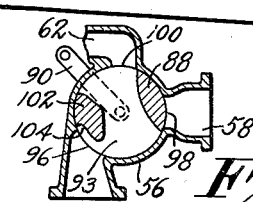
Fig. 4 is a section of a control valve shown in Fig. 3, in another position of the valve.

The valve member is formed so that as the valve moves toward the terminal position shown in Fig. 4, throttling of the discharge from the supercharger is effected by the part 102, which part may advantageously be undercut as at 104 so as to prevent any possibility of complete closure of the port 96 upon movement of the valve member past its normal terminal position due to improper adjustment of the parts. As a further precautionary measure, a safety valve may be employed in the connection between the compressor and the inlet side of the valve 56, as illustrated in Fig. 5, to be described.

With the apparatus adjusted as shown in Fig. 3, the operation is as follows. Supercharging air is delivered through valve 56 to the inlet of the carburetor and, with the throttle valve 70 in idling position, most of the air is by-passed to the exhaust line through the pipe 76. As the throttle is opened, the valve 74 is moved toward closed position and the supercharging air flows through the carburetor and to the engine, the amount going to the engine as compared with the amount flowing through the connection 76 depending upon the degree to which the throttle is opened. With a fully opened throttle, valve 74 is closed and the entire charge goes to the engine.

It will be observed that this control is entirely independent of the control of the movable valve member of valve 56 which controls the flow of air from the supercharger. By moving the control lever 40 to the left from the position shown in the figure, the connection 62 to the exhaust line is opened while the connection leading to the engine is closed, and continued movement of the valve member to the terminal position shown in Fig. 4 results in not only closing off the flow of air to the engine but also in the throttling of the discharge from the supercharger so as to increase the amount of work done. This in turn produces the desired braking effect reacting on the engine. If the engine is the power plant of a vehicle, it will be evident that the braking effect may be utilized to provide deceleration for the vehicle by permitting the driving connection between the engine and the driving wheels to remain unbroken. It will thus be evident that with the arrangement shown the compressor has a dual function, providing a supply of air under pressure for supercharging the engine and in addition providing, when desired, an effective brake.

Figure 5:
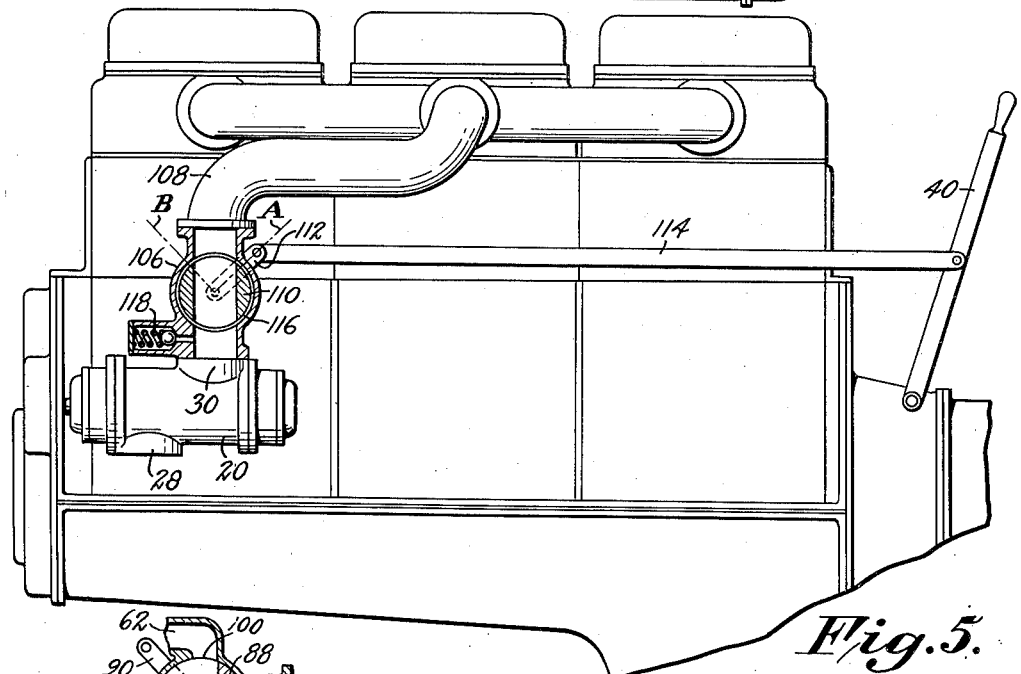
Fig. 5 is a side elevation partly in section of a supercharged oil engine embodying the invention.

In Fig. 5, an arrangement somewhat similar to that shown in Fig. 3 is illustrated, the compressor in this instance being utilized as a supercharger for providing combustion air under initial pressure to the cylinders of an oil engine to which fuel and air are separately admitted. In the figure, the fuel injecting arrangement has been omitted since the specific means for supplying fuel to the engine is not germane to the present invention and may be of any desired suitable type.

In the arrangement shown, the outlet 30 of the compressor is connected by means of a control valve 106 to the inlet pipe 108 of the engine. This valve has a movable valve member 110 connected by means of lever 112 and link 114 to the control lever 40. Member 110 is provided with a circumferential groove 116 for permitting a limited supply of air to pass through the valve even when the valve member is moved from the open terminal position A, as shown in the figure, to the closed terminal position in which the lever 112 is in the position indicated at B.

The passage through the valve provided by the groove 116 is designed to prevent complete closure of the outlet of the compressor so as to avoid building up of injurious pressures within the compressor when the valve is closing. As a further precaution, a safety valve 118 may advantageously be interposed between the control valve and the compressor. The operation of the arrangement shown in Fig. 5 is generally similar to that shown in Fig. 3, the compressor providing the desired amount of supercharging air when the engine is working and providing a braking effect reacting on the engine when the control valve is closed or partially closed so as to increase the back pressure against which the compressor works.

In connection with the use of the compressor as a supercharger for an oil engine, it is to be noted that when some of the air is permitted to flow to the engine cylinders when the control valve is closed and producing relatively high back pressure on the compressor, the air which goes to the cylinders is substantially preheated by the compression and imparts a certain heating effect to the engine cylinders which is desirable.

From the embodiments hereinbefore described, it will be evident that the invention may be applied in many different ways which will suggest themselves to those skilled in the art and it will further be evident that the invention is applicable to many specifically different types of engines and engine drives either for land or marine vehicles or for stationary drives where the nature of the installation is such that it is desired to provide a brake for slowing down the moving parts.

The invention is accordingly to be understood as not restricted to the embodiments hereinbefore described by way of example but is to be considered as embracing all forms of apparatus falling within the scope of the appended claims when they are construed as broadly as consistent with the state of the prior art.

We claim:

1. The combination with an internal combustion engine, of a supercharging compressor of the displacement type driven by the engine for supplying combustion air under pressure to the engine, and adjustable control means for arbitrarily increasing the work done by the compressor to provide a braking effect reacting on the engine.

2. The combination, with an engine having an inlet for combustion air, of a compressor of the displacement type driven by the engine for supplying air under pressure to said inlet and an adjustable valve in the discharge line from the compressor for adjustably throttling the outlet of the compressor to increase the work of compression and thereby produce a braking effect reacting on the engine.

3. The combination, with an engine having an inlet for combustion air, of a compressor of the displacement type driven by the engine for supplying air under pressure to said inlet, an adjustable valve in the discharge line from the compressor for adjustably throttling the outlet of the compressor to increase the work of compression and thereby produce a braking effect reacting on the engine, and means for limiting the value of the back pressure produced by said throttling.

4. The combination with a carburetor engine of a compressor of the displacement type driven by the engine for supplying a supercharged fuel charge to the engine and an adjustable control valve for controlling the supply of supercharging air flowing to the engine, said control valve being movable to a position producing a throttling effect on the discharge from the compressor for increasing the work of compression to thereby produce a braking effect reacting on the engine.

5. The combination with an engine having an inlet manifold, of a throttle valve for controlling flow of fluid to said manifold, a carburetor on the inlet side of said throttle, said carburetor having an inlet, a compressor driven by the engine, means including a control valve for connecting the outlet of the compressor with the inlet of the carburetor, a conduit in communication with the inlet side of the carburetor and a third valve for controlling flow of air from the compressor through said conduit, said throttle valve and said third valve being interconnected so that one of the valves closes as the other opens and vice versa and said control valve being movable to a position in which the flow of air from the compressor to the inlet of the carburetor is cut off and the flow of air from the compressor is throttled to increase the back pressure against which the compressor operates, to thereby increase the work of compression and produce a braking effect reacting on the engine.

6. The combination with an engine having a throttle controlled inlet, of a compressor driven by said engine for supplying air under pressure to said inlet, a passage in communication with the outlet of the compressor for conducting a part of the compressed air to a zone of low pressure, a valve interconnected with the throttle for controlling said passage, said valve being connected so as to open as the throttle closes and vice versa and a control valve operable independently of the throttle valve for shutting off the supply of air from the compressor to the engine.

7. The combination with an internal combustion engine having an inlet of a compressor driven by the engine, a control valve for controlling flow of air delivered by the compressor, said control valve having an inlet port and separate outlet ports controlling a first branch passage and a second branch passage respectively, means for connecting the first branch passage with the inlet of the engine and means for connecting the second branch passage to a low pressure zone, said control valve being movable from a position in which substantially unrestricted flow of air is permitted from the compressor through said first branch to a position in which flow of air to said first branch is cut off and restricted flow of air is permitted from the compressor to said second branch.

8. The combination with an internal combustion engine having an inlet for combustion air, of a compressor driven by said engine and means including a control valve for conducting air from the compressor to said inlet, said control valve being movable from a position providing substantially unrestricted flow of air to said inlet to a position closing the connection between the compressor and said inlet and said control valve having a by-pass passage for permitting a restricted quantity of air to flow to said inlet when the valve is in closed position.

9. The combination with an internal combustion engine, of an axial flow screw type compressor driven by the engine for supplying combustion air under pressure to the engine, and adjustable control means for arbitrarily increasing the work done by the compressor to provide a braking effect reacting on the engine.

10. The combination, with an engine having an inlet for combustion air, of an axial flow screw type compressor driven by the engine for supplying air under pressure to said inlet and an adjustable valve in the discharge line from the compressor for adjustably throttling the outlet of the compressor to increase the work of compression and thereby produce a braking effect reacting on the engine.

11. The combination with a carburetor engine of an axial flow screw type compressor driven by the engine for supplying a supercharged fuel charge to the engine and an adjustable control valve for controlling the supply of supercharging air flowing to the engine, said control valve being movable to a position producing a throttling effect on the discharge from the compressor for increasing the work of compression to thereby produce a braking effect reacting on the engine.

12. The combination with an engine having a throttle controlled inlet, of an axial flow screw type compressor driven by said engine for supplying air under pressure to said inlet, a passage in communication with the outlet of the compressor for conducting a part of the compressed air to a zone of low pressure, a valve interconnected with the throttle for controlling said passage, said valve being connected so as to open as the throttle closes and vice versa and a control valve operable independently of the throttle valve for shutting off the supply of air from the compressor to the engine.

13. The combination with an internal combustion engine, of an axial flow screw type compressor permanently connected to and driven by the engine for supplying combustion air under pressure to the engine and adjustable control means for arbitrarily increasing the work done by the compressor to provide a braking effect reacting on the engine.

14. The combination with an internal combustion engine, of an axial flow screw type compressor permanently connected to and driven by the engine for supplying combustion air under pressure to the engine, valve means in the discharge line from the compressor for adjustably throttling the outlet of the compressor to increase the work of compression and thereby produce a braking effect reacting on the engine and means for delivering a part of the compressed air passing said valve to the air inlet of the engine and the remaining part of said compressed air to a zone of low pressure.

ALF LYSHOLM.
GÖSTA WAHLSTEN.